United States Patent [19]
Daines et al.

[11] Patent Number: 5,474,325
[45] Date of Patent: Dec. 12, 1995

[54] SLIDE-IN PROTECTIVE COVER FOR PASSENGER AIRBAG MODULE

[75] Inventors: Michael J. Daines, Brigham City; Joseph L. Ralston, North Ogden; Larry D. Rose, Layton, all of Utah

[73] Assignee: Morton International, Inc., Chicago, Ill.

[21] Appl. No.: 315,090

[22] Filed: Sep. 29, 1994

[51] Int. Cl.$^6$ ................................................ B60R 21/16
[52] U.S. Cl. ........................................ 280/728.3; 280/732
[58] Field of Search ........................... 280/728 R, 728 A, 280/728 B, 731, 732, 728.1, 728.2, 728.3

[56] References Cited

U.S. PATENT DOCUMENTS

| | | | |
|---|---|---|---|
| 4,941,678 | 7/1990 | Lauritzen et al. | 280/732 |
| 5,058,919 | 10/1991 | Paquette et al. | 280/732 |
| 5,110,647 | 5/1992 | Sawada et al. | 280/728 B |
| 5,261,693 | 11/1993 | Krickl et al. | 280/732 |
| 5,335,936 | 8/1994 | Faigle et al. | 280/728 A |

*Primary Examiner*—Karin L. Tyson
*Assistant Examiner*—Paul N. Dickson
*Attorney, Agent, or Firm*—George W. Rauchfuss, Jr.; Gerald K. White

[57] ABSTRACT

The sidewalls of a reaction canister for a passenger-side airbag module define a pair of opposed, parallel channels on their inner surfaces. A protective cover in the form of a thin rectangular plastic body has two opposite edges thickened to form lobes. These lobes are inserted into the channels before the second end plate is attached to the canister.

13 Claims, 1 Drawing Sheet

5,474,325

SLIDE-IN PROTECTIVE COVER FOR PASSENGER AIRBAG MODULE

TECHNICAL FIELD

This invention relates to the field of automotive airbags. More specifically, it pertains to an improved protective cover for a passenger-side airbag module.

BACKGROUND ART

A conventional passenger-side airbag module comprises a reaction canister in the form of a trough which encloses the folded airbag. The lower portion of the trough encloses, or is in communication with, an inflator which generates gases. The mouth of the airbag is secured in the canister in a position to receive the generated gases and inflate upon the occurrence of a crash of sufficient magnitude. The open mouth of the trough is normally closed by a protective cover which serves to keep out dirt and otherwise protect the folded airbag prior to and during its installation in the vehicle. This installation is normally behind a portion of the dashboard. In normal operation, the expanding airbag splits the protective cover and then the dashboard to emerge in the passenger compartment.

The protective cover most commonly used is TYVEK® (a trademark of E. I. dupont de Nemours and Company), a spun-bonded olefin paper which is relatively expensive. Furthermore, the protective cover is normally mounted to the outside of the reaction canister. This requires more cover material than is desirable, increasing the expense. Furthermore, assembly of the protective cover to the reaction canister often involves the need to employ adhesive or other fasteners. The invention eliminates typical scrap and rework costs associated with adhesive or fasterners.

Accordingly, it is a primary object of the present invention to provide an improved cover which is smaller, lighter in weight, and less expensive than covers previously employed. Another object is to provide such a cover which is readily installed without the need for special fastening means. Other objects, features, and advantages will become apparent from the following description and appended claims.

DISCLOSURE OF INVENTION

The invention comprises a flexible plastic protective cover which is substantially rectangular in shape. Two opposite side edges of the cover are thickened. The opposed inside walls of the reaction canister carry grooves. The thickened edges of the protective cover slide into the grooves, which serve to hold the cover in place. A weakened tearline in the cover permits it to split under the influence of the expanding airbag.

BEST MODE FOR CARRYING OUT THE INVENTION

Figure 1:
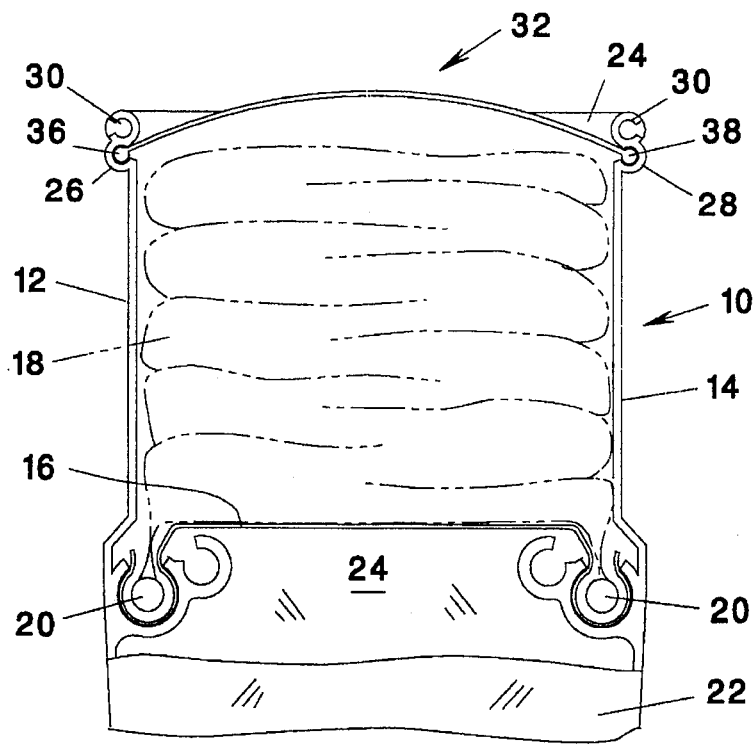
FIG. 1 is a partial end view of a reaction canister and cover in accordance with this invention, one end plate being partially broken away to illustrate the internal construction.

With particular reference to FIG. 1, there is illustrated a reaction canister 10 which comprises a left 12 and right 14 sidewall. The sidewalls are substantially parallel and form a trough therebetween. The bottom of the sidewalls may be joined to form a housing (not shown) for an inflator. A diffuser plate 16 supports a folded airbag 18 whose open mouth is restrained by dowels 20. These features form no part of the invention and are disclosed in co-pending application Ser. No. 08/191,959 filed Feb. 4, 1994 by D. J. Paxton et al. and assigned to the same assignee as the present application. The disclosure of that application is incorporated herein by reference. The ends of the reaction canister are closed by a near end plate 22, which is illustrated substantially broken away, and a far end plate 24.

In accordance with the present invention, the inwardly facing surface of each of sidewalls 12, 14 defines a respective generally cylindrical channel 26, 28. The channels 26, 28 are substantially parallel and in opposed relationship to one another. The sidewalls may also include such features as screw slots 30 which serve to support the endplates and do not form a part of this invention. The ends of the channels 26, 28 may also serve as screw slots. The top of the reaction canister 10 is closed by a flexible cover 32.

Figure 2:
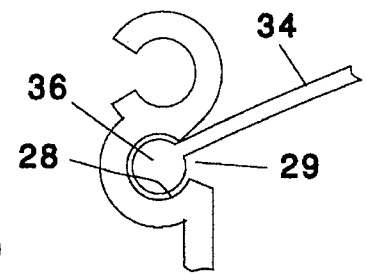
FIG. 2 is an enlarged view illustrating the relationship between a thickened edge of the cover and its retaining groove.

The cover 32 may be formed of plastic, such as high density polypropylene. It is substantially rectangular and has a planar body portion 34 which is relatively thin. In one embodiment it had a thickness of approximately 1 mm. Two opposed side edges are thickened into substantially cylindrical lobes 36, 38. These lobes are dimensioned so as to slide easily within the respective channels 26, 28 of the sidewalls 12, 14 as illustrated in FIG. In the referenced embodiment the diameter of each lobe was approximately 3.5 mm. As will be most clearly apparent from FIG. 2, a longitudinal slot 29 in each of the channels 26, 28 is wide enough to receive the body portion 34 but sufficiently narrow to retain its respective lobe 36, 38.

Figure 3:
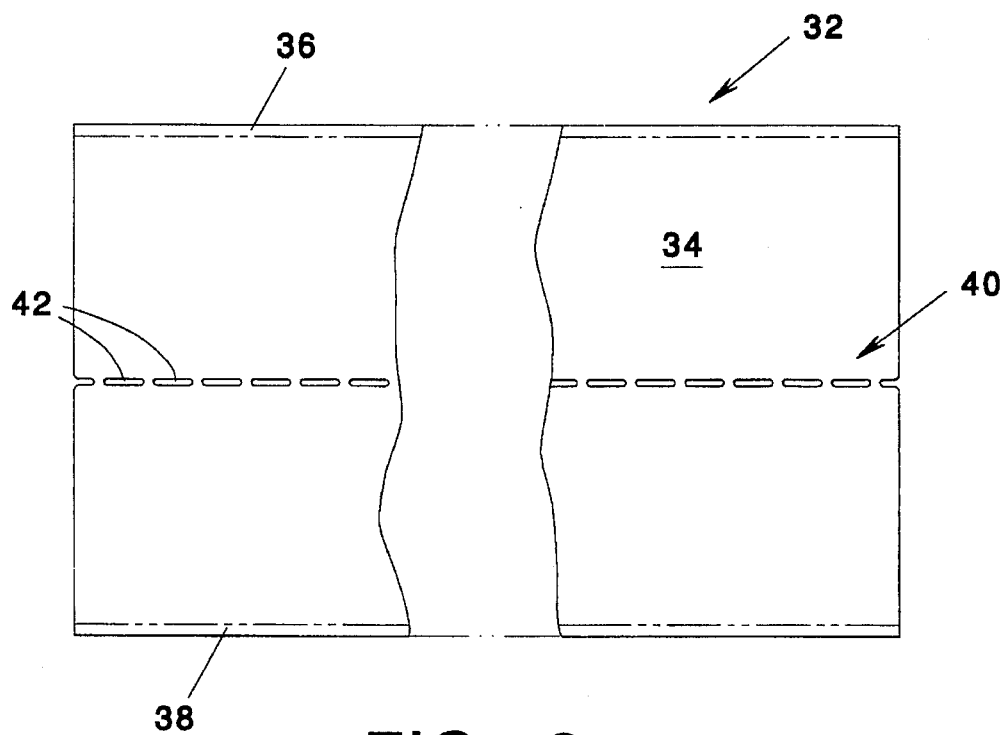
FIG. 3 is a plan view of a protective cover of this invention.

As previously explained, the flexible cover 32 is designed to split upon inflation of the airbag 18. To that end, it is provided with a weakened "tearline" 40 extending along its length. This tearline may be in the form of a single thin linear strip or, as illustrated in FIG. 3, a series of discontinuous slots 42, or as a combination of the two.

When the flexible cover 32 bursts, the resulting segments become guide flaps which bridge the regions between the opening of the reaction canister 10 and the instrument panel. This reduces the possibility of snagging or ripping the airbag during deployment. The location of the tearline 40 may be positioned in accordance with the particular installation and, in most instances, will be located along the center line of the cover.

It will now be apparent that the flexible cover of this invention is minimal in size, weight and, therefore, expense. This results directly from its being supported solely by channels formed on the inner surfaces of the left 12 and right 14 sidewalls. Furthermore, it is very easily assembled as it requires only that the lobes 36, 38 be slid into the channels 26, 28 before the second endplate is installed. As a result of this unique locking feature, no other fasteners, adhesives, etc. are required.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. A reaction canister for an automotive airbag module which comprises:

first and second substantially parallel sidewalls, each of said sidewalls including an inwardly facing surface defining a trough therebetween for enclosing a folded airbag;

a first channel defined by the inwardly facing surface of said first sidewall;

a second channel defined by the inwardly facing surface of said second sidewall; and a flexible cover in the form of a substantially rectangular, planar, body having opposed first and second side edges thicker than, and substantially coplanar with, said body and slidably inserted into, and retained within, the respective first and second channels to span said trough and protect an enclosed airbag.

2. The reaction canister of claim 1 wherein the body of said flexible cover defines a weakened tear line substantially parallel to said first and second side edges.

3. The reaction canister of claim 2 wherein said tear line is substantially intermediate said first and second side edges.

4. The reaction canister of claim 1 wherein said flexible cover is plastic.

5. The reaction canister of claim 4 wherein said plastic is polypropylene.

6. The reaction canister of claim 5 wherein said plastic is high density polypropylene.

7. The reaction canister of claim 3 wherein said flexible cover is plastic.

8. The reaction canister of claim 7 wherein said plastic is polypropylene.

9. The reaction canister of claim 8 wherein said plastic is high density polypropylene.

10. The reaction canister of claim 1 wherein each of said first and second channels is substantially cylindrical.

11. The reaction canister of claim 8 wherein each of said first and second channels is substantially cylindrical.

12. A reaction canister for an automotive airbag module which comprises:

first and second substantially parallel sidewalls, each of said sidewalls including an inwardly facing surface defining a trough therebetween for enclosing a folded airbag;

a substantially cylindrical first channel defined by the inwardly facing surface of said first sidewall;

a substantially cylindrical second channel defined by the inwardly facing surface of said second sidewall; and a flexible cover in the form of a substantially rectangular, planar, body having opposed first and second substantially cylindrical side edges thicker than said body and slidably inserted into, and retained within, the respective first and second channels to span said trough and protect an enclosed airbag.

13. A reaction canister for an automotive airbag module which comprises:

first and second substantially parallel sidewalls, each of said sidewalls including an inwardly facing surface defining a trough therebetween for enclosing a folded airbag;

a first substantially cylindrical channel defined by the inwardly facing surface of said first sidewall;

a second substantially cylindrical channel defined by the inwardly facing surface of said second sidewall; and a flexible polypropylene cover in the form of a substantially rectangular, planar, body having opposed first and second substantially cylindrical side edges thicker than said body and slidably inserted into, and retained within, the respective first and second channels to span said trough and protect an enclosed airbag, said body defining a weakened tear line substantially parallel to, and intermediate, said first and second side edges.

* * * * *